(12) United States Patent
Morooka

(10) Patent No.: US 12,321,651 B2
(45) Date of Patent: Jun. 3, 2025

(54) INFORMATION PROCESSING APPARATUS, METHOD, AND STORAGE MEDIUM FOR STORING PROGRAM

(71) Applicant: CANON KABUSHIKI KAISHA, Tokyo (JP)

(72) Inventor: Hidekazu Morooka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 18/457,104

(22) Filed: Aug. 28, 2023

(65) Prior Publication Data
US 2024/0069830 A1 Feb. 29, 2024

(30) Foreign Application Priority Data
Aug. 30, 2022 (JP) .................. 2022-137106

(51) Int. Cl.
*G06F 3/12* (2006.01)
(52) U.S. Cl.
CPC .......... *G06F 3/1255* (2013.01); *G06F 3/1204* (2013.01); *G06F 3/1228* (2013.01); *G06F 3/1288* (2013.01)
(58) Field of Classification Search
CPC .... G06F 3/1255; G06F 3/1204; G06F 3/1228; G06F 3/1288
USPC ........................................................ 358/1.15
See application file for complete search history.

(56) References Cited

U.S. PATENT DOCUMENTS

| 7,839,521 | B2* | 11/2010 | Bard | G06F 3/1222 |
| | | | | 705/16 |
| 9,177,236 | B2* | 11/2015 | Tanaka | G06K 15/4095 |
| 10,827,092 | B1* | 11/2020 | Bier | H04N 1/32776 |
| 2021/0306473 | A1* | 9/2021 | Inouye | H04N 1/00307 |

FOREIGN PATENT DOCUMENTS

JP 2021124791 A 8/2021

* cited by examiner

*Primary Examiner* — Allen H Nguyen
(74) *Attorney, Agent, or Firm* — Canon U.S.A., Inc. IP Division

(57) ABSTRACT

An information processing apparatus generates print data for causing a printer that can execute a cloud print service to execute printing. The information processing apparatus obtains cost information for when printing is executed based on the generated print data and obtains limitation information related to cost and held in the cloud print service. The information processing apparatus determines whether to execute printing according to the cloud print service based on the cost information and the limitation information and controls transmission of the generated print data to the cloud print service based on a result of that determining.

21 Claims, 19 Drawing Sheets

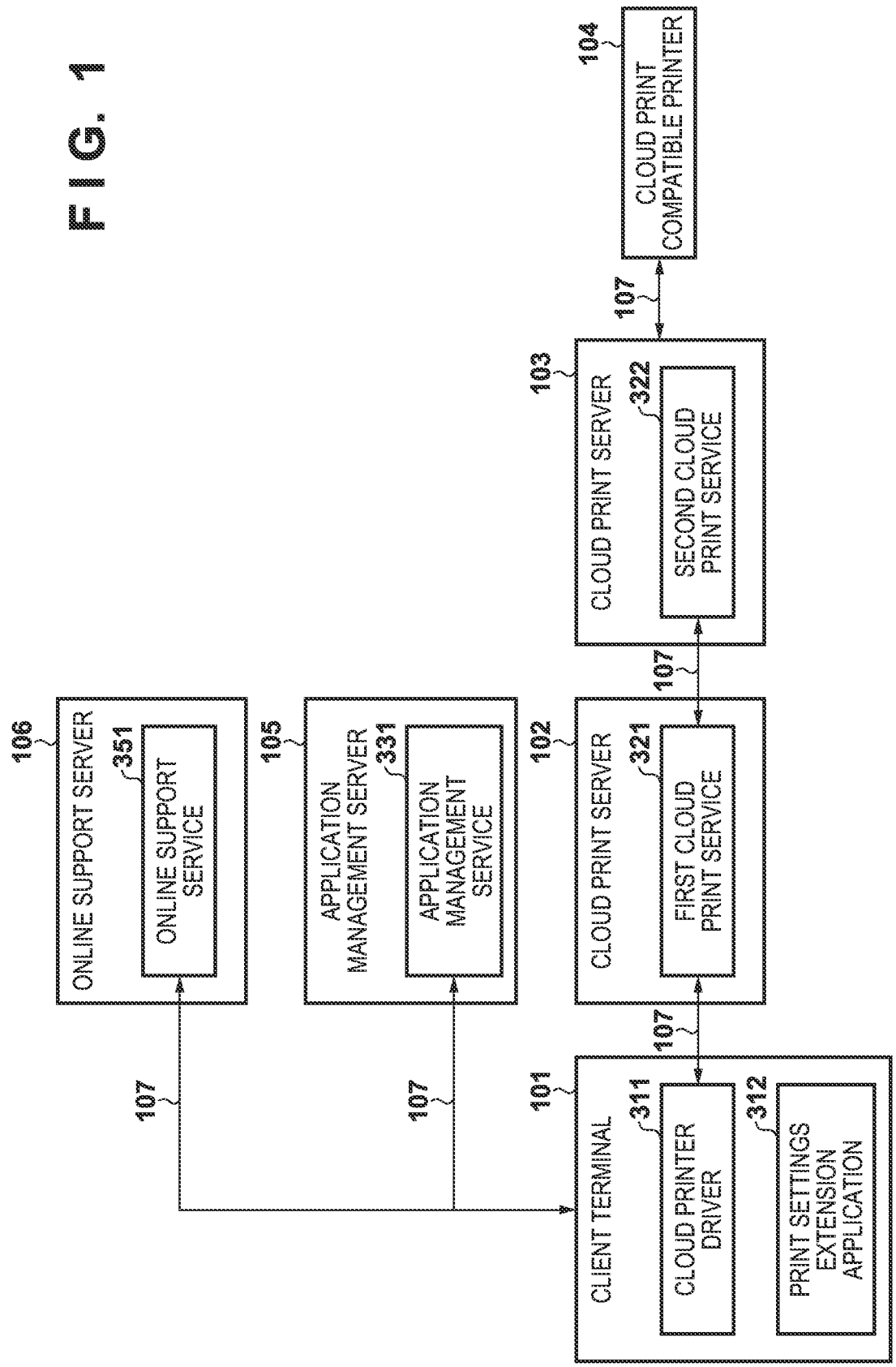

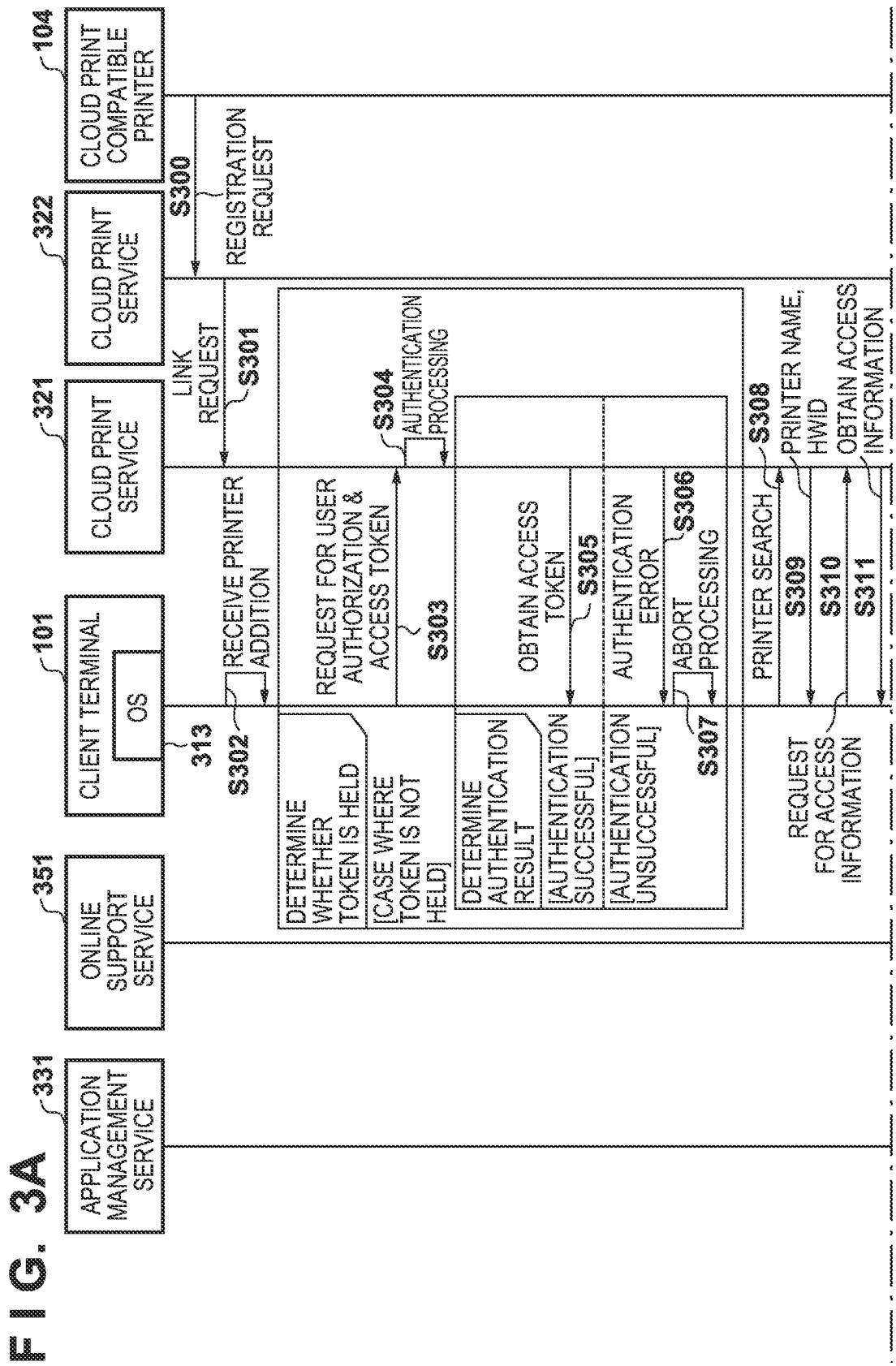

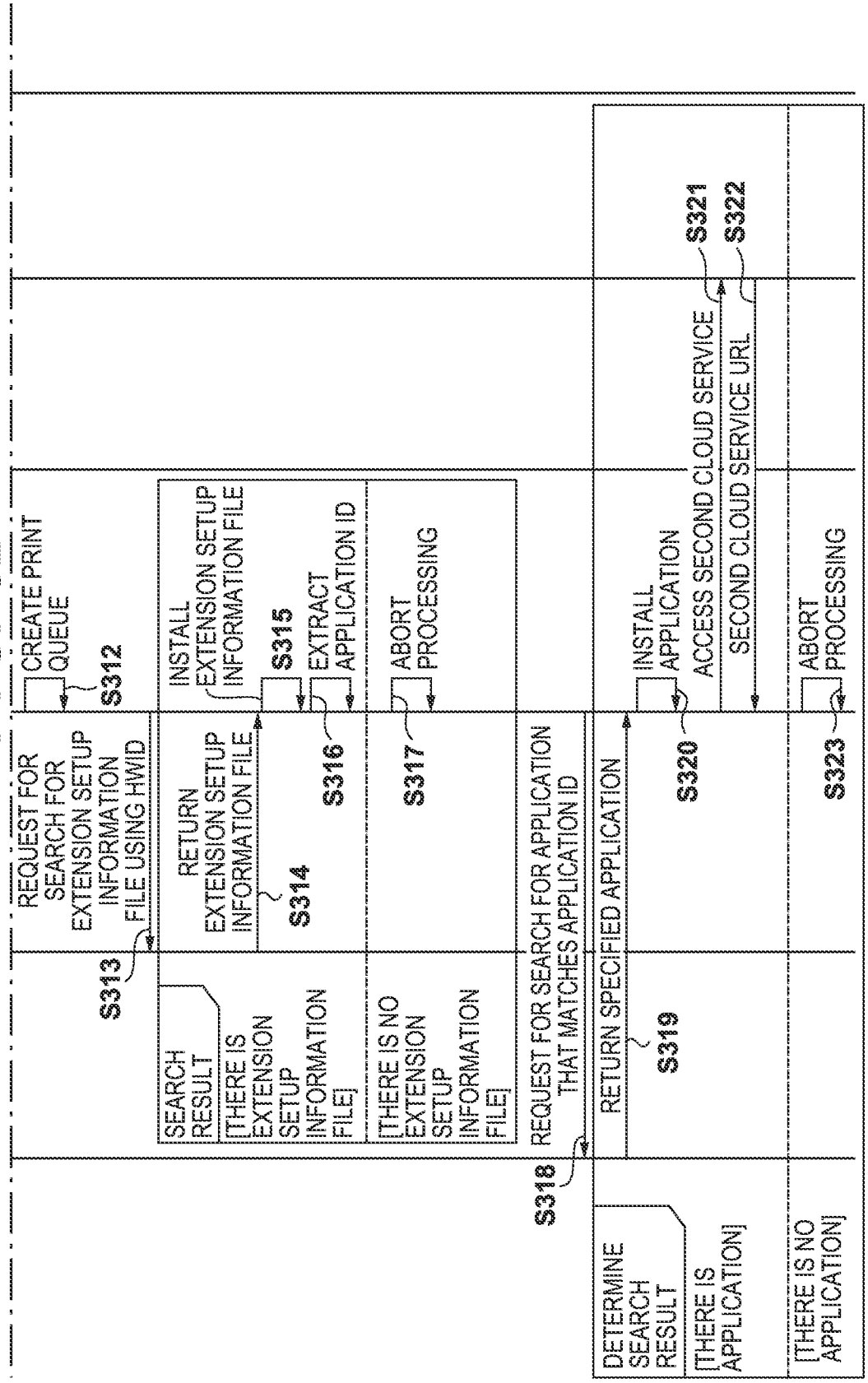

F I G. 5A

```
<?xml version="1.0" encoding="utf-8"?>
<PrintDeviceCapabilities
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.com/2003/08/printing/printschemakeywords"
  xmlns:psk12="http://schemas.com/2013/12/printing/printschemakeywordsv12"
  xmlns:psf="http://schemas.com/2003/08/printing/printschemaframework"
  xmlns:psf2="http://schemas.com/2013/12/printing/printschemaframework2"
  xmlns="http://schemas.com/2013/12/printing/printschemaframework2"
  version="2">

<psk:JobCopiesAllDocuments psf2:psftype="ParameterDef">
    <psf:DataType xsi:type="xsd:QName" psf2:psftype="Property">xsd:integer</psf:DataType>
    <psf:DefaultValue xsi:type="xsd:integer" psf2:psftype="Property">1</psf:DefaultValue>
    <psf:Mandatory xsi:type="xsd:QName" psf2:psftype="Property">psk:Unconditional</psf:Mandatory>
    <psf:MaxValue xsi:type="xsd:integer" psf2:psftype="Property">999</psf:MaxValue>
    <psf:MinValue xsi:type="xsd:integer" psf2:psftype="Property">1</psf:MinValue>
    <psf:Multiple xsi:type="xsd:integer" psf2:psftype="Property">1</psf:Multiple>
    <psf:UnitType xsi:type="xsd:string" psf2:psftype="Property">copies</psf:UnitType>
  </psk:JobCopiesAllDocuments>
```

FIG. 5B

```xml
<psk:ISOA4 psf2:psftype="Option">
  <psk12:PortraitImageableSize xsi:type="psf2:ImageableAreaType" psf2:psftype="Property">12700,12700,184600,271600</psk12:PortraitImageableSize>
  <pskMediaSizeHeight xsi:type="xsd:integer" psf2:psftype="ScoredProperty">297000</pskMediaSizeHeight>
  <pskMediaSizeWidth xsi:type="xsd:integer" psf2:psftype="ScoredProperty">210444</pskMediaSizeWidth>
</psk:ISOA4>
<psk:NorthAmericaLetter psf2:psftype="Option" psf2:default="true">
  <psk12:PortraitImageableSize xsi:type="psf2:ImageableAreaType" psf2:psftype="Property">12700,12700,190500,254000</psk12:PortraitImageableSize>
  <pskMediaSizeHeight xsi:type="xsd:integer" psf2:psftype="ScoredProperty">279400</pskMediaSizeHeight>
  <pskMediaSizeWidth xsi:type="xsd:integer" psf2:psftype="ScoredProperty">215900</pskMediaSizeWidth>
</psk:NorthAmericaLetter>
</psk:PageMediaSize>

<psk:PageOrientation psf2:psftype="Feature">
  <psk:Landscape psf2:psftype="Option" />
  <psk:Portrait psf2:psftype="Option" psf2:default="true" />
</psk:PageOrientation>
        ……
```

FIG. 5C

```xml
<psk:PageOutputColor psf2:psftype="Feature">
  <psk:Color psf2:psftype="Option" psf2:default="true">
    <psk:DeviceBitsPerPixel xsi:type="xsd:integer" psf2:psftype="ScoredProperty">24</psk:DeviceBitsPerPixel>
    <psk:DriverBitsPerPixel xsi:type="xsd:integer" psf2:psftype="ScoredProperty">24</psk:DriverBitsPerPixel>
  </psk:Color>
</psk:PageOutputColor>

<psk:CloudService psf2:psftype="Feature">
  <psk:CloudPrintUrl ="https://CloudService_101.com">
  <psk:CloudTenantUrl ="https://CloudService_101.com/tenantID/627986" />
  </psk:CloudPrintUrl>
</psk:CloudService>

</PrintDeviceCapabilities>
```

501

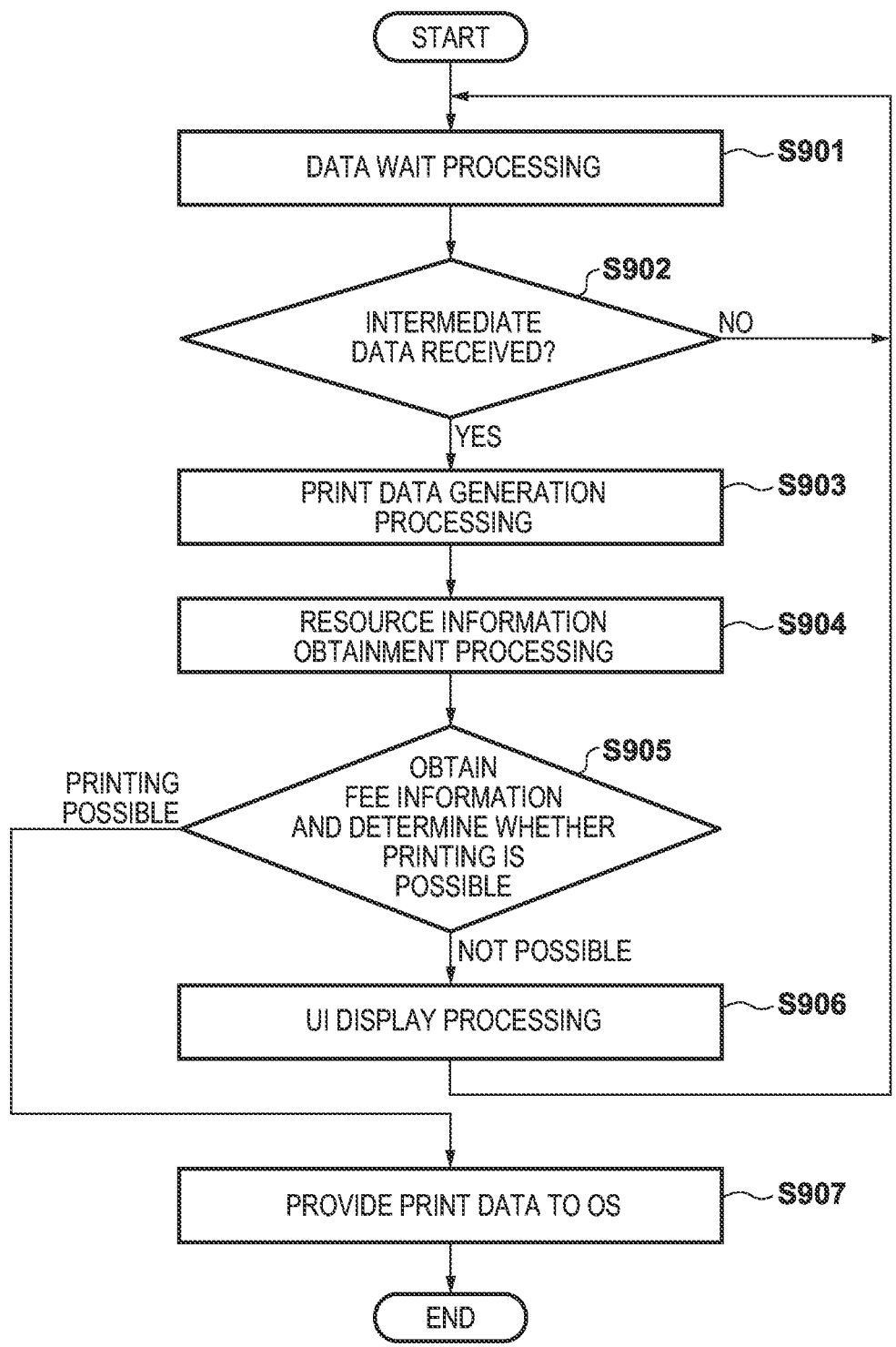

- RESTAPI

- GET https://printservice.com/tenat01/api/budget/userid=xxxx@mail.com/

| URL | UserID |
  |---|---|
  | https://printservice2.com/tenat01/api/ | xxxx@mail.com/ |

- Response
  - {{ "UserID":"XXX@mail.com","TotalBudget":"1200"}}

F I G. 12

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaa8a"   ~ 1201
AUMID = "PrinterApp_aaaaaaaaaa8a!App"
Device.ExtensionDesc = "PrintApp"
MsStoreType = 2
PrinterHardwareId = "VirtualCloudPrinter__TYPE001"   ~ 1202
```

FIG. 14A

```xml
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.com/2003/08/printing/printschemakeywords"
 xmlns:psk12="http://schemas.com/2013/12/printing/printschemakeywordsv12"
 xmlns:psf="http://schemas.com/2003/08/printing/printschemaframework"
 xmlns:psf2="http://schemas.com/2013/12/printing/printschemaframework2"
 xmlns="http://schemas.com/2013/12/printing/printschemaframework2"
 version="2">

<psk:JobCopiesAllDocuments psf2:psftype="ParameterDef">
  <psf:DataType xsi:type="xsd:QName" psf2:psftype="Property">xsd:integer</psf:DataType>
  <psf:DefaultValue xsi:type="xsd:integer" psf2:psftype="Property">1</psf:DefaultValue>
  <psf:Mandatory xsi:type="xsd:QName" psf2:psftype="Property">psk:Unconditional</psf:Mandatory>
  <psf:MaxValue xsi:type="xsd:integer" psf2:psftype="Property">999</psf:MaxValue>
  <psf:MinValue xsi:type="xsd:integer" psf2:psftype="Property">1</psf:MinValue>
  <psf:Multiple xsi:type="xsd:integer" psf2:psftype="Property">1</psf:Multiple>
  <psf:UnitType xsi:type="xsd:string" psf2:psftype="Property">copies</psf:UnitType>
 </psk:JobCopiesAllDocuments>

<psk:PageMediaSize psf2:psftype="Feature">
  <pskISOA4 psf2:psftype="Option">
   <psk12:PortraitImageableSize xsi:type="psf2:ImageableAreaType" psf2:psftype="Property">12700,12700,184600,271600</psk12:PortraitImageableSize>
   <pskMediaSizeHeight xsi:type="xsd:integer" psf2:psftype="ScoredProperty">297000</pskMediaSizeHeight>
   <pskMediaSizeWidth xsi:type="xsd:integer" psf2:psftype="ScoredProperty">210444</pskMediaSizeWidth>
  </pskISOA4>
  ......
```

FIG. 14B

```
<pskPageOutputColor psf2:psftype="Feature">
  <pskColor psf2:psftype="Option" psf2:default="true">
    <pskDeviceBitsPerPixel xsi:type="xsd:integer" psf2:psftype="ScoredProperty">24</pskDeviceBitsPerPixel>
    <pskDriverBitsPerPixel xsi:type="xsd:integer" psf2:psftype="ScoredProperty">24</pskDriverBitsPerPixel>
  </pskColor>
</pskPageOutputColor>

<pskCloudService psf2:psftype="Feature">
  <pskCloudPrintUrl ="https://CloudService_101.com">
    <pskLoginUser = "Yamada">
      <pskPrintServerUser = "ABC" />
      <pskPrintServerPass = "111" />
      <pskCloudTenantUrl ="https://CloudService_101.com/tetantID/627966" />
    </pskLoginUser>
    <pskLoginUser = "Tanaka">
      <pskPrintServerUser = "DEF" />
      <pskPrintServerPass = "222" />
      <pskCloudTenantUrl ="https://CloudService_101.com/tetantID/627700" />
    </pskLoginUser>
  </pskCloudPrintUrl>
</pskCloudService>

</PrintDeviceCapabilities>
```

⎫
⎬ 1401
⎭

INFORMATION PROCESSING APPARATUS, METHOD, AND STORAGE MEDIUM FOR STORING PROGRAM

BACKGROUND OF THE DISCLOSURE

Field of the Disclosure

The present disclosure relates to an information processing apparatus for extending the functions of a device driver, a method, and a storage medium for storing a program.

Description of the Related Art

General-purpose printer drivers (local printer drivers) that communicate directly with an image forming apparatus using industry-standard protocols, such as Internet Printing Protocol (IPP), are known. The local printer drivers can communicate with printers from a plurality of printer vendors. Therefore, by using a local printer driver, a job can be transmitted to an image forming apparatus without the user installing a vendor-specific printer driver.

In addition, printing systems in which a plurality of cloud print services are linked are known. In such printing systems, a job is transferred from a first cloud print service to a second cloud print service, and the job can be printed from a printer registered in the second cloud print service. With this configuration, printers that do not support the first cloud print service can be connected to the second cloud print service and then used for printing, and functions that are not provided by the first cloud print service can be provided by the second cloud print service. Generally, in cloud print services, a printer driver (cloud printer driver) for the cloud print service is installed in an information processing apparatus. The information processing apparatus transmits a job to the cloud print service using the cloud printer driver. In cloud print services, printing is performed by a job being transmitted to an image forming apparatus.

The aforementioned local printer driver and cloud printer driver handle jobs to be printed by image forming apparatuses of various vendors. Therefore, there are limitations on items and functions that can be set. Japanese Patent Laid-Open No. 2021-124791 describes installing, on a client computer, a print extension application for performing print settings that cannot be set in a typical print settings screen provided by a cloud print service or OS.

SUMMARY OF THE DISCLOSURE

If a job that has been transmitted to a cloud print service falls under the printing limitations of that cloud print service, printing fails.

The present disclosure provides a mechanism for reducing the possibility of a print failure for when a job is transmitted to a cloud print service.

The present disclosure in one aspect provides a non-transitory computer-readable storage medium storing a program configured to cause a computer of an information processing apparatus to execute a method comprising: generating print data for causing a printer that can execute a cloud print service to execute printing; obtaining cost information for when printing is executed based on the print data generated; obtaining limitation information related to cost and held in the cloud print service; and determining whether to execute printing according to the cloud print service based on the cost information obtained and the limitation information obtained and control transmission of the print data generated to the cloud print service based on a result of that determination.

According to the present disclosure, it is possible to reduce the possibility of a print failure when a job is transmitted to a cloud print service.

Further features of the present disclosure will become apparent from the following description of exemplary embodiments with reference to the attached drawings.

BRIEF DESCRIPTION OF THE DRAWINGS

FIG. 1 is a diagram illustrating a configuration of a printing system in cloud printing.

FIGS. 3A and 3B are diagrams illustrating a sequence of the respective apparatuses.

FIG. 9 is a flowchart for explaining processing by a print settings extension application.

FIG. 12 is a diagram illustrating an extension setup information file.

FIGS. 14A and 14B are diagrams illustrating device configuration information managed by the OS.

DESCRIPTION OF THE EMBODIMENTS

Figure 2A:
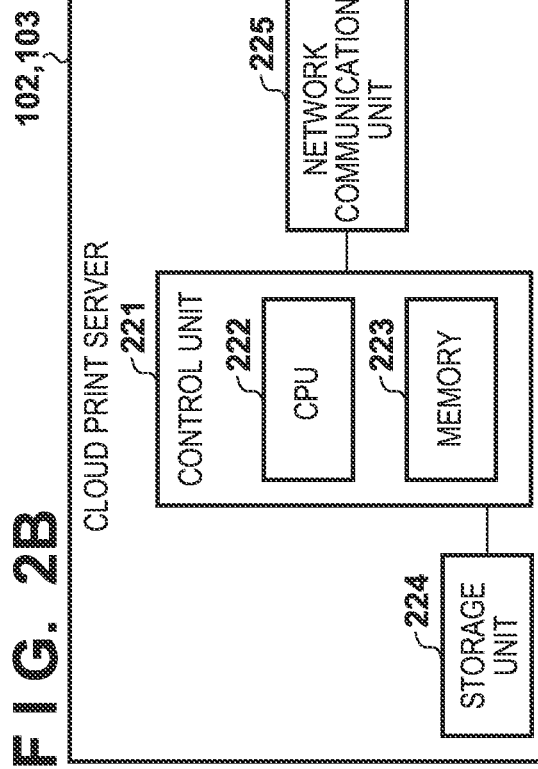
FIGS. 2A to 2E are diagrams illustrating hardware configurations of respective apparatuses of the printing system.

Hereinafter, embodiments will be described in detail with reference to the attached drawings. Note, the following embodiments are not intended to limit the scope of the present disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

FIG. 1 is a diagram illustrating an example of a configuration of a printing system in cloud printing according to the present embodiment. In the printing system, a client terminal 101, cloud print servers 102 and 103, an application management server 105, a cloud print compatible printer 104, and an online support server 106 are connected via a network 107. The cloud print server 102 is a server apparatus that provides a first cloud print service 321. The cloud print server 103 is a server apparatus that provides a second cloud print service 322. A cloud printer driver 311 for cloud print service is installed on the client terminal 101.

The printing system according to the present embodiment is a printing system in which a plurality of cloud print services are linked, and a job generated by the cloud printer driver 311 is transferred to the second cloud print service 322 via the first cloud print service 321. Then, printing is performed in the cloud print compatible printer 104 registered in the second cloud print service 322.

FIG. 1 illustrates one client terminal 101 and one cloud print compatible printer 104; however, there may be a plurality of client terminals 101 and cloud print compatible printers 104. The cloud print server 102, the cloud print server 103, the application management server 105, and the online support server 106 may each be a server system configured by a plurality of information processing apparatuses. By configuring each server to be a server system that is made up of a plurality of information processing apparatuses, the load can be distributed among the plurality of information processing apparatuses. In addition, the cloud print server 102, the cloud print server 103, the application management server 105, and the online support server 106 may be virtually configured in one physical information processing apparatus.

The network 107 is a wired network, a wireless network, or a network including both. In the present embodiment, a WAN, such as the Internet, is envisioned as a connection to the cloud print services. However, the network 107 may be a closed environment, such as an in-house LAN.

The client terminal 101 is, for example, an information processing apparatus, such as a PC, a tablet, or a smartphone, and is a terminal that may be directly operated by a user. On the client terminal 101, any application software may be executed. The cloud print compatible printer 104 is a device for performing printing on a printing medium, such as a sheet, and is an image forming apparatus for converting print data received via the network 107 to image data and printing an image on a printing medium. The cloud print compatible printer 104 receives print data generated by the cloud printer driver 311 of the client terminal 101 via the cloud print servers 102 and 103.

The cloud print server 102 receives print data and print capability information from the client terminal 101. The print capability information includes a tenant URL of the second cloud print service 322, which will be described later. Then, the cloud print server 102 transmits the received print data and print capability information to the cloud print server 103. The cloud print server 103 transmits the print data and print capability information received from the cloud print server 102 to the cloud print compatible printer 104.

The application management server 105 is a server apparatus that provides an application management service 331 for maintaining and managing various applications including a print settings extension application 312. The application management server 105 receives, from the client terminal 101, the identification information of an application and a request to download that application. The application management server 105 transmits, information to the client terminal 101, the application that has been identified based on the received identification information.

The online support server 106 is a server apparatus that provides an online support service 351. The online support service 351 provides an extension setup information file, which describes information for extending the functions of the client terminal 101, to the client terminal 101. An extension setup information file is, for example, a file for which the file extension is expressed, "inf".

Next, hardware configurations of respective apparatuses in the system according to the present embodiment will be described with reference to FIGS. 2A to 2E. FIG. 2A is a block diagram illustrating an example of a hardware configuration of the client terminal 101. The client terminal 101 includes a display unit 216, an operation unit 217, a storage unit 214, a control unit 211, and a network communication unit 215. The storage unit 214 is a non-volatile storage apparatus, such as a hard disk or a solid state drive (SSD), for example, and is capable of storing and rewriting digital data. The control unit 211 is configured to include a CPU 212 and a memory 213 and comprehensively controls the entire operation of the client terminal 101. The CPU 212 realizes the operation of the client terminal 101 according to the present embodiment, for example, by loading, to the memory 213, a program stored in the storage unit 214 and executing the program. The memory 213 is the main storage memory of the CPU 212 and is used as a work area and a temporary storage region for loading various programs.

The network communication unit 215 is an apparatus for communicating with the network 107 and transmits and receives digital data to and from an external server, another client terminal, or the like via the network 107. The display unit 216 is an apparatus for displaying visual information to a user, such as a liquid crystal display. The operation unit 217 is an apparatus for receiving an operation input from a user by a keyboard, a mouse, or the like. It may be configured as an apparatus having functions of both the display unit 216 and the operation unit 217, such as a touch panel. The configuration of the client terminal 101 is not limited to the configuration of FIG. 2A and may appropriately include a configuration that accords with the functions that can be realized by a device used as the client terminal 101.

Figure 2B:
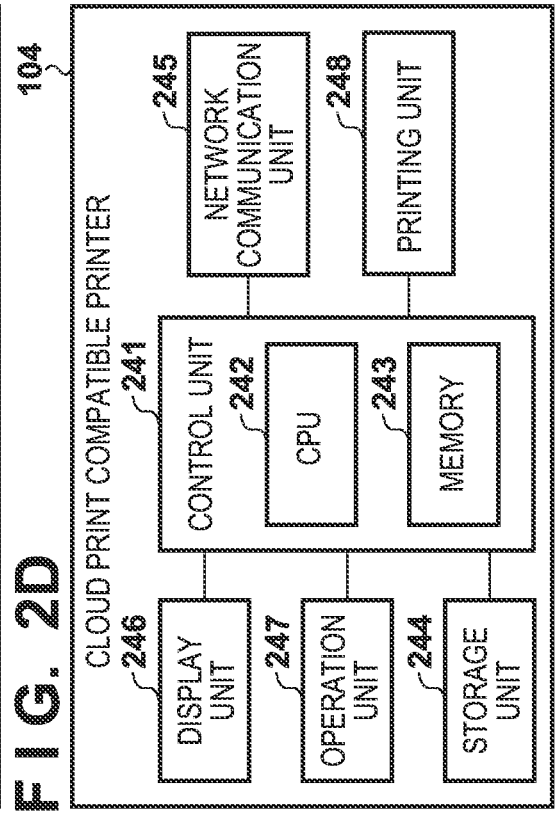

FIG. 2B is a block diagram illustrating an example of hardware configurations of the cloud print servers 102 and 103. The cloud print servers 102 and 103 have a common configuration, and here, the cloud print server 102 will be described as a representative example. The cloud print server 102 includes a storage unit 224, a control unit 221, and a network communication unit 225. The storage unit 224 is a non-volatile storage apparatus, such as a hard disk or an SSD, for example, and is capable of storing and rewriting digital data. The control unit 221 is configured to include a CPU 222 and a memory 223 and comprehensively controls the entire operation of the cloud print server 102. The CPU 222 realizes the operation of the cloud print server 102 according to the present embodiment, for example, by loading, to the memory 223, a program stored in the storage unit 224 and executing the program. The memory 223 is the main storage memory of the CPU 222 and is used as a work area and a temporary storage region for loading various programs.

The network communication unit 225 is an apparatus for communicating with the network 107 and transmits and receives digital data to and from an external server, a client terminal, or the like via the network 107. The configuration of the cloud print server 102 is not limited to the configuration of FIG. 2B and may appropriately include a configuration that accords with the functions that can be realized by a device used as the cloud print server 102. A description will be given assuming that the cloud print servers 102 and 103 are each configured by a single information processing apparatus having a hardware configuration illustrated in FIG. 2B. However, the cloud print servers 102 and 103 may each be configured by a plurality of information processing apparatuses, which are illustrated in FIG. 2B. The configuration of the cloud print server 102 and the configuration of the cloud print server 103 may be different from each other.

Figure 2C:
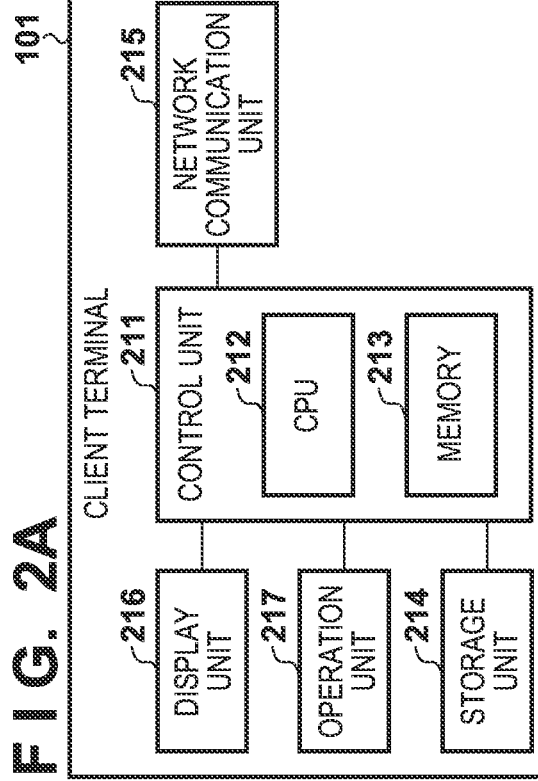

FIG. 2C is a block diagram illustrating an example of a hardware configuration of the application management server 105. The application management server 105 includes a display unit 236, an operation unit 237, a storage unit 234, a control unit 231, and a network communication unit 235. The storage unit 234 is a non-volatile storage apparatus, such as a hard disk or an SSD, for example, and is capable of storing and rewriting digital data. The control unit 231 is configured to include a CPU 232 and a memory 233 and comprehensively controls the entire operation of the application management server 105. The CPU 232 realizes the operation of the application management server 105 according to the present embodiment, for example, by loading, to the memory 233, a program stored in the storage unit 234 and executing the program. The memory 233 is the main storage memory of the CPU 232 and is used as a work area and a temporary storage region for loading various programs.

The network communication unit 235 is an apparatus for communicating with the network 107 and transmits and receives digital data to and from an external server, a client terminal, or the like via the network 107. The configuration of the application management server 105 is not limited to the configuration of FIG. 2C and may appropriately include a configuration that accords with the functions that can be realized by a device used as the application management server 105. A description will be given assuming that the application management server 105 is configured by a single information processing apparatus having a hardware configuration illustrated in FIG. 2C. However, the application management server 105 may be configured by a plurality of information processing apparatuses.

Figure 2D:
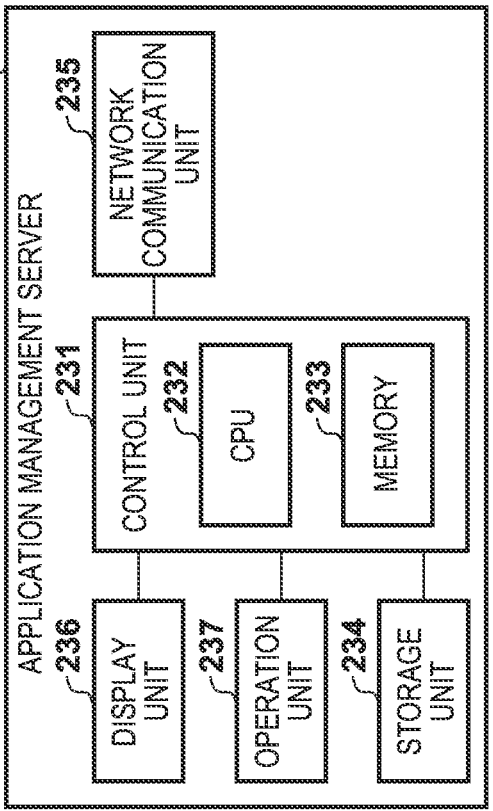

FIG. 2D is a block diagram illustrating an example of a hardware configuration of the cloud print compatible printer 104. The cloud print compatible printer 104 includes a display unit 246, an operation unit 247, a storage unit 244, a control unit 241, a network communication unit 245, and a printing unit 248. The display unit 246 is an apparatus for displaying information to a user, such as a touch panel or an LED provided in the cloud print compatible printer 104. The operation unit 247 is an apparatus for receiving an operation input from a user and, in addition to a touch panel, may include physical keys, such as a numeric keypad. The storage unit 244 is a non-volatile storage apparatus, such as a hard disk or an SSD, for example, and is capable of storing and rewriting digital data. The control unit 241 is configured to include a CPU 242 and a memory 243 and comprehensively controls the entire operation of the cloud print compatible printer 104. The CPU 242 realizes the operation of the cloud print compatible printer 104 according to the present embodiment, for example, by loading, to the memory 243, a program stored in the storage unit 244 and executing the program. The memory 243 is the main storage memory of the CPU 242 and is used as a work area and a temporary storage region for loading various programs.

The network communication unit 245 is an apparatus for communicating with the network 107 and mainly receives print data and transmits information indicating the state of the cloud print compatible printer 104, such as an error, to an external apparatus, such as a server. The printing unit 248 is an apparatus for executing printing processing by performing a series of operations of feeding, printing, and discharging on a printing medium, such as a printing sheet accommodated in a cassette or a tray. A printing method of the printing unit 248 is not limited, and, for example, an electrophotographic method or an inkjet printing method is used. In addition, in some cases, the printing unit 248 includes a double-sided unit, which is used at the time of discharge, and a finishing apparatus for stapling or punching processing and the like. In the present embodiment, a single-function printer, which performs only a printing function, will be described as an example of the cloud print compatible printer 104. However, a multi-function printer (multifunction peripheral (MFP)), which has a scanner function, a fax function, and the like, may be used.

Figure 2E:
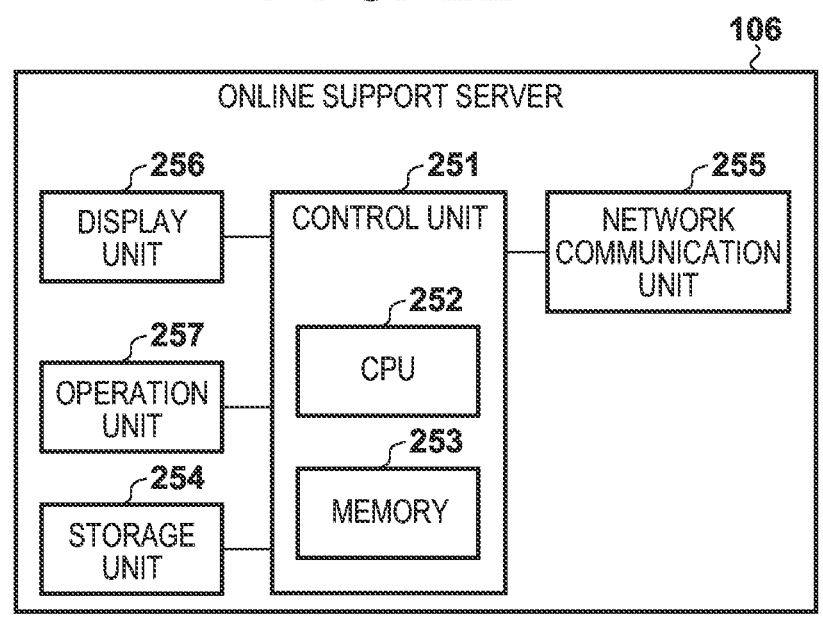

FIG. 2E is a block diagram illustrating an example of a hardware configuration of the online support server 106. In the present embodiment, a description will be given assuming that the online support server 106 is configured by a single information processing apparatus; however, it may be configured by a plurality of information processing apparatuses. The online support server 106 includes a display unit 256, an operation unit 257, a storage unit 254, a control unit 251, and a network communication unit 255. The display unit 256 is an apparatus for displaying visual information to a user, such as a liquid crystal display. The operation unit 257 is an apparatus for receiving an operation input from a user by a keyboard, a mouse, or the like. It may be configured as an apparatus having functions of both the display unit 256 and the operation unit 257, such as a touch panel. The storage unit 254 is a non-volatile storage apparatus, such as a hard disk or an SSD, for example, and is capable of storing and rewriting digital data. The storage unit 254 stores an extension setup information file, which is a file that describes information for extending the functions provided to the client terminal 101.

The control unit 251 is configured to include a CPU 252 and a memory 253 and comprehensively controls the entire operation of the online support server 106. The CPU 252 realizes the operation of the online support server 106 according to the present embodiment, for example, by loading, to the memory 253, a program stored in the storage unit 254 and executing the program. The memory 253 is the main storage memory of the CPU 252 and is used as a work area and a temporary storage region for loading various programs.

The network communication unit 255 is an apparatus for communicating with the network 107 and transmits and receives digital data to and from an external server, a client terminal, or the like via the network 107. For example, the online support server 106 receives, from the client terminal 101 via the network communication unit 255, a request for obtaining an extension setup information file stored in the storage unit 254. Then, the online support server 106 transmits a corresponding extension setup information file to the client terminal 101.

Next, an example of a sequence of each apparatus and each service according to the present embodiment will be described with reference to FIGS. 3A and 3B. FIGS. 3A and 3B illustrate a sequence from when the cloud print compatible printer 104 is registered to the cloud print service 322 to when the print settings extension application 312 is installed in the client terminal 101. Hereinafter, a sequence of apparatuses will be described as a sequence of services.

First, the cloud print compatible printer 104 receives, from a user, a printer registration operation for registering the cloud print compatible printer 104 in the second cloud print service 322 (hereinafter referred to as the cloud print service 322). The cloud print compatible printer 104 transmits a printer registration request to the cloud print service 322 along with the device identification information of the printer (step S300).

Upon receiving the printer registration request, the cloud print service 322 transmits a URL of the cloud print service 322 for printer registration to the cloud print compatible printer 104. When the user accesses the URL from the cloud print compatible printer 104 or an information processing apparatus, an input screen for inputting a user ID and a password is displayed on the display unit of the terminal that accessed the URL. The user inputs the user ID and the password for using the cloud print service 322 and logs in to the cloud print service 322. Upon successful login of the user, the cloud print service 322 transmits, to the cloud print compatible printer 104, a request to obtain the information necessary for registering the printer. In response to the request, the cloud print compatible printer 104 transmits printer information to the cloud print service 322. The cloud print service 322 registers the printer information (such as device identification information) of the cloud print compatible printer 104 and generates a print queue for the cloud print compatible printer 104.

Next, the cloud print service 322 transmits, to the first cloud print service 321 (hereinafter referred to as the cloud print service 321), a request to link cloud print services (step S301). The cloud print service 322 and the cloud print service 321 are linked by the request to link cloud print services from the cloud print service 322. Specifically, for example, additional information, such as a virtual printer name associated with the cloud printer service 322 and information for accessing the cloud print service 322, is set for a printer registration API (not illustrated) of the cloud print service 321. The virtual printer name associated with the cloud printer service 322 is, for example, a name, such as "VirtualCloudPrinter_TYPE001". The information for accessing the cloud print service 322 is, for example, an access URL by which the cloud print service 322 can be accessed. With such settings, the device identification information (HWID) that corresponds to a virtual printer is registered in the cloud print service 321. The virtual printer here is an application that operates as a printer driver. Therefore, in an apparatus, such as the client terminal 101, that has downloaded the virtual printer from the cloud print service 321 and installed the virtual printer, the virtual printer is displayed as a printer selection candidate in a region 402 of the setting screen of FIG. 4, which will be described later. The virtual printer does not relay communication between the various applications and the printer but generates a job based on the data received from an application and transmits the job to the cloud print service 321. In the present embodiment, assume that print data and print capability information are collectively referred to as a job.

Next, the installation of the print settings extension application 312 in the client terminal 101 will be described. The installation of the print settings extension application 312 is performed when the user performs, in the client terminal 101, a setup operation for performing printing in the cloud print compatible printer 104. In order to register the cloud print compatible printer 104 in the client terminal 101, a standard printing function, which is one of the functions of the operating system (OS) 313 of the client terminal 101, is used. The OS 313 receives an operation for adding a printer, which is one of the setup operations by the user (step S302). The setup operation for performing printing in the cloud print compatible printer 104 is an operation that is received via the screen of FIG. 4, for example.

Figure 4:
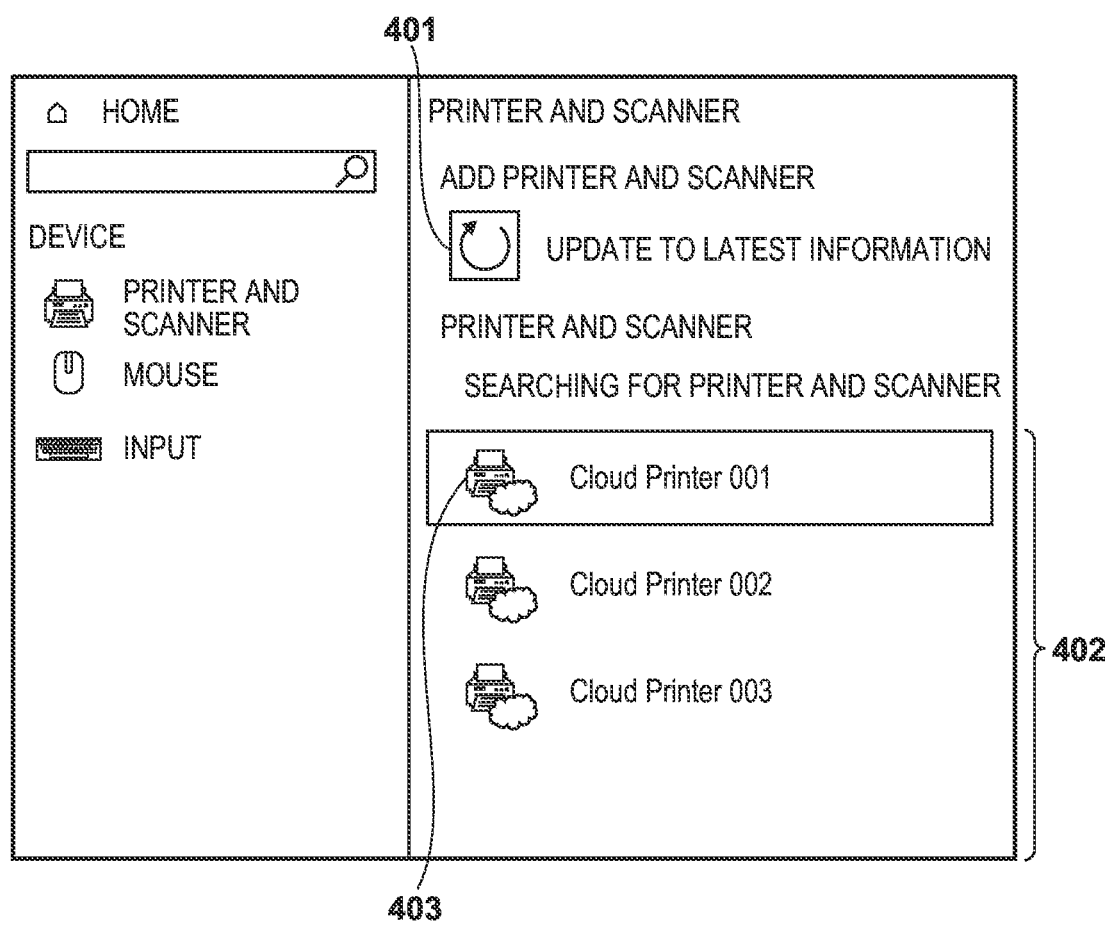
FIG. 4 is a diagram illustrating a screen displayed by an OS.

FIG. 4 is a setting screen that is displayed by the OS 313 of the client terminal 101 and is related to a printer. By the user selecting an object 401, the OS 313 receives a printer search instruction. Upon receiving the printer search instruction, the OS 313 determines whether an access token for the cloud print service 321 is held. If it is determined that the access token is not held, the OS 313 displays a screen (not illustrated) for inputting user information (a login name and a password). The OS 313 transmits, to the cloud print service 321, the user information inputted via the screen and makes a request for a user authorization and an access token (step S303).

The cloud print service 321 performs authentication processing using the user information received from the client terminal 101 (step S304). Upon completing the authentication processing, the cloud print service 321 notifies the client terminal 101 of the result of the authentication processing. If the result of the user authentication is successful, the OS 313 obtains an access token from the cloud print service 321 (step S305). Meanwhile, if the result of the user authentication is unsuccessful, the cloud print service 321 notifies the client terminal 101 of an authentication error (step S306). The OS 313 aborts the processing based on the received authentication error information and terminates the processing of FIGS. 3A and 3B (step S307).

If the OS 313 holds an access token or obtains an access token in step S305, the processing proceeds to step S308.

The OS 313 searches for printers registered in the cloud print service 321 and printers connected to the network 107. The OS 313 performs a printer search (step S308) by transmitting, to the cloud print service 321, a request for obtaining printer information that is registered in the cloud print service 321.

Upon receiving the request for obtaining printer information, the cloud print service 321 transmits the printer information to the client terminal 101 (step S309). The printer information that is transmitted to the client terminal 101 in step S309 is information that includes the printer name assigned to a printer registered to the cloud print service 321 and the device identification information (HWID) of that printer. HWID, for example, corresponds to the identifier "VirtualCloudPrinter_TYPE001" of a description 1202 "PrinterHardwareID" of the extension setup information file of FIG. 12.

Upon obtaining the printer information transmitted from the cloud print service 321, the OS 313 displays a list of printers on the display unit 216 based on that printer information and the printer information detected in the search in the network 107.

The region 402 of the setting screen of FIG. 4 indicates an example of the displayed list of printers, and the printer information received from the cloud print service 321 is displayed in a list. "Cloud Printer 001" to "Cloud Printer 003" that are displayed in the region 402 indicate printer information that is registered in the cloud print service 321. In FIG. 4, an example in which a printer was not detected in the search in the network 107 is illustrated. In this way, the printer information obtained from the cloud print service 321 and the printer information detected by the search in the network 107 are displayed in a list. The printer information received from the cloud print service 321 is displayed with an icon 403 added so as to be distinguishable.

The user selects, from the list of printers displayed in the region 402 of the setting screen of FIG. 4, the printer information that corresponds to a printer that they wish to register in the client terminal 101. The OS 313 queries the cloud print service 321 for access information that corresponds to the selected printer information (step S310). Here, the access information is, for example, a URL by which the cloud print service 322 can be accessed.

In response to the query, the cloud print service 321 transmits access information to the client terminal 101 (step S311). The OS 313 generates a print queue of the cloud printer driver 311, which has basic apparatus capability information that is included in the OS 313 (step S312).

Next, processing for installing the print settings extension application 312, which extends the functions of the cloud print driver 311, based on the selected printer information will be described. The cloud printer driver 311 handles jobs to be printed by printers of various vendors; thus, there are limitations on the items and functions that can be set. By installing the print settings extension application 312, the user can use vendor-specific functions.

First, the OS 313 performs processing for adding additional identification information to device identification information (HWID). This processing is necessary for obtaining an extension setup information file from the online support server 105, and additional identification information is added so that the string is different from the device identification information. In the present embodiment, the OS 313 adds, to the device identification information, additional identification information, which indicates that it is an application that corresponds to a printer. For example, "PrinterApp_" is added as additional identification information to the device identification information. "PrinterApp_" is only one example, and another character string, a number, or a symbol may be used. As a result of the above-described processing, if the device identification information of a virtual printer is, for example, "VirtualCloudPrinter", the device identification information after the above-described processing will be "PrinterApp_VirtualCloudPrinter". Such processing makes it possible to distinguish it from another device application.

The OS 313 transmits, to the online support service 351, a search request for an extension setup information file that contains the device identification information to which the additional identification information has been added (step S313). By transmitting a search request, "PrinterApp_VirtualCloudPrinter" to which additional identification information has been assigned, for example, is transmitted to the online support service 351.

In the online support service 351, an extension setup information file is stored. FIG. 12 is a diagram illustrating an example of an extension setup information file. The extension setup information file is a file created by a cloud print service provider or a vendor of the cloud print compatible printer 104 and registered in the online support service 351. In the extension setup information file, an application identifier for identifying the print settings extension application 312 is described. For example, in a value of "PackageFamilyName" of a description 1201 in the extension setup information file of FIG. 12, a character string of the identification information (additional identification information) of the print settings extension application 312 is described. In addition, in a value of "PrinterHardwareID" of the description 1202, a character string of device identification information of a virtual printer or the cloud print compatible printer 104 is described.

In this way, in the extension setup information file of the online support service 351, both the identifier of the printer driver and the identifier of the print settings extension application are described. The online support service 351 identifies an extension setup information file for which "PackageFamilyName" and "PrinterHardwareID" in the extension setup information file match the device identification information and additional identification information specified in the request.

When an extension setup information file is identified as a result of the search, the online support service 351 transmits an extension setup information file 700 to the client terminal 101 (step S314). The OS 313 installs, in association with the print queue generated in step S312, the extension setup information file transmitted from the online support service 351 (step S315). The OS 313 extracts an application ID from the installed extension setup information file (step S316). The application ID is an identifier that is defined as a value of "PackageFamilyName" in the extension setup information file.

This concludes the description of the processing for downloading, from the online support service 351, and installing an extension setup information file that corresponds to the cloud print compatible printer 104.

Meanwhile, there may be cases where an extension setup information file is not identified in the online support service 351 as a result of a search. At this time, the OS 313 aborts the processing for installing the print settings extension application 312 (step S317) and terminates the processing indicated in FIGS. 3A and 3B. For example, the OS 313 aborts the processing for installing the print settings extension application 312 when an extension setup information file cannot be received within a predetermined period from the search request in step S313 or when an error notification is received from the online support service 351.

In the following, processing for when an extension setup information file has been obtained and an application ID has been extracted in step S316 will be described.

The OS 313 makes, to the application management service 331, a search request for an application that matches the extracted application ID (step S318). The application management service 331 stores an application that runs on the client terminal 101 in association with an application ID, which is an identifier of the application. The application and the application ID are registered in the application management service 331 by the cloud print service provider or the vendor that provides the cloud print compatible printer 104.

If the application management service 331 holds the print settings extension application 312 that matches the requested application ID, the application management service 331 transmits the print settings extension application 312 to the client terminal 101 (step S319). Here, the print settings extension application 312 to be transmitted is an application to which the same ID as the transmitted application ID has been assigned.

The OS 313 installs, in association with the print queue created in step S312, the obtained print settings extension application 312 (step S320). When the installation of the print settings extension application 312 is completed, the OS 313 queries the cloud print service 322 based on the URL obtained from the print settings extension application 312 (step S321). As will be described later in FIG. 7, when that query is made, the account information/password that have been received via a screen of FIG. 8A are transmitted to the cloud print service 322. In the cloud print service 322, when there are a plurality of tenants, a tenant that corresponds to the account information transmitted from the client terminal 101 is identified. Then, the tenant information (which includes the tenant URL) of that tenant is transmitted to the client terminal 101, and the OS 313 receives the tenant information (step S322). If a plurality of tenants are identified, a plurality of pieces of tenant information is transmitted to the client terminal 101. When the tenant information is received, the OS 313 displays a screen of FIG. 8B, which will be described later, and receives a selection of the tenant information from the user. The tenant URL that is included in the selected tenant information is registered in the device configuration information of FIGS. 5A to 5C, which is managed by the OS 313.

The installed print settings extension application 312 is set in the OS 313 so as to notify an event at a timing at which the print queue associated with the print settings extension application 312 is set in a print settings screen. The installed print settings extension application 312 is started after the client terminal 101 is powered on and the OS 313 is started and acts as a background task after it is started.

If the application management service 331 does not hold the print settings extension application 312 that matches the requested application ID, the OS 313 aborts the processing for installing the print settings extension application 312 (step S323) and terminates the processing of FIGS. 3A and 3B. In this case, the generated print queue is installed in association with the cloud printer driver 311.

In the above, it has been described that an extension setup information file is searched for by adding a predetermined character string to device identification information (HWID). However, configuration may be taken so as to perform a search without adding a predetermined character string so long as the file for printer driver installation can be identified.

Figure 6:
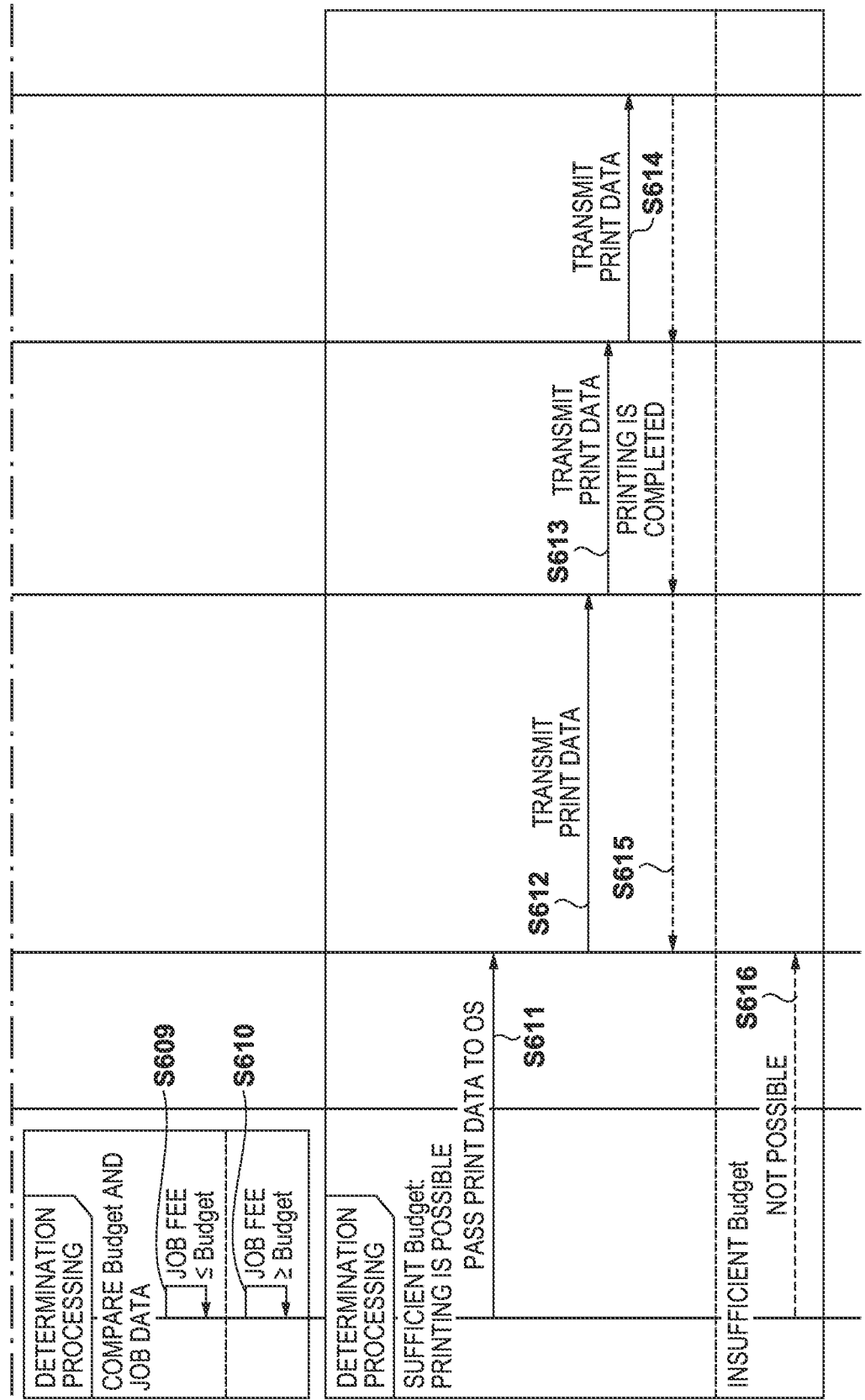
FIGS. 6A and 6B are diagrams illustrating a sequence of the respective apparatuses.

Next, an example of a sequence of each apparatus and each service according to the present embodiment will be described with reference to FIGS. 6A and 6B. FIGS. 6A and 6B illustrate a sequence from when the print queue created in step S312 of FIGS. 3A and 3B are selected to when print data is transmitted to the cloud print service 321. Hereinafter, a sequence of apparatuses will be described as a sequence of services. The document generation application 315 in FIGS. 6A and 6B are, for example, an application that is installed in the client terminal 101. The document generation application 315 is an application such as an application for creating document data, an application for creating presentation material, or an application for displaying photographs and image data, for example.

Figures 10, 11:
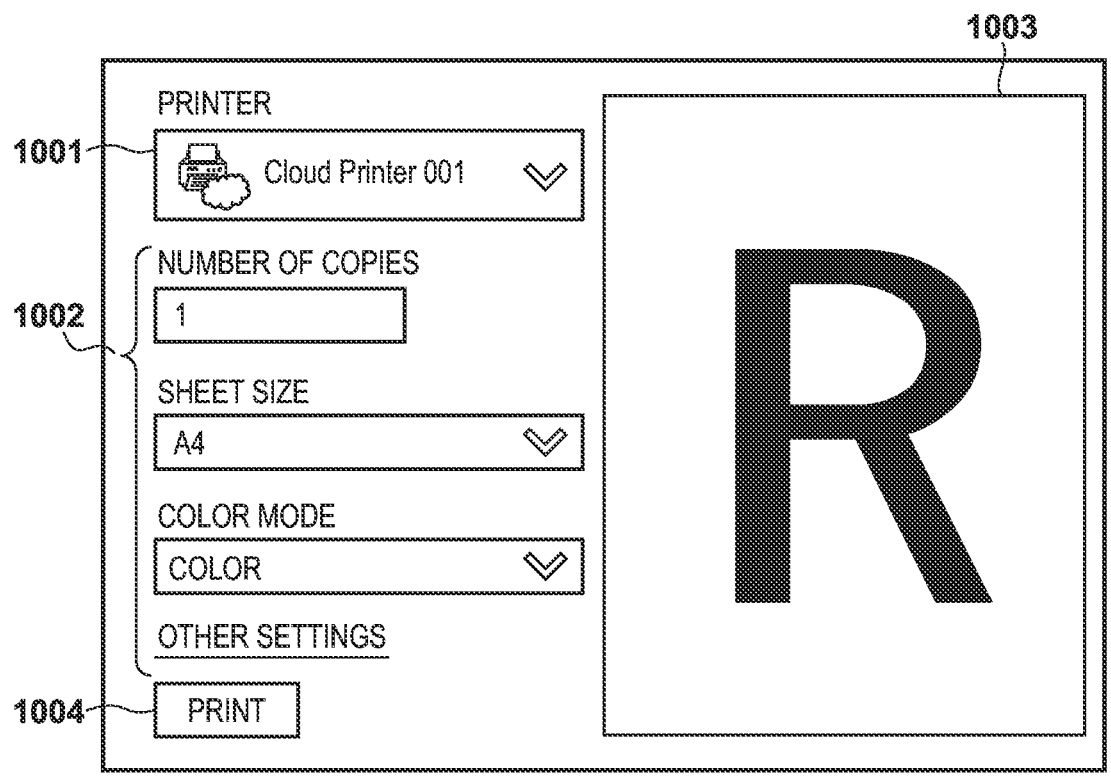
FIG. 10 is a diagram illustrating a screen displayed by a document generation application.
FIG. 11 is a diagram illustrating a command for obtaining resource information.

The document generation application 315 displays, on the display unit 216 as an initial print settings screen, the print settings screen of FIG. 10 on which a selection of a print queue can be received. In the present embodiment, a description will be given assuming that a screen on which the print queue can be selected is an initial print settings screen and the document generation application 315 displays the initial print settings screen. However, the initial print settings screen may be displayed by the OS 313. In the initial print settings screen, an object 1001 for selecting a print queue, an object 1002 for performing various print settings, and a print preview image 1003 are displayed. The user selects a print queue on the initial print settings screen. The information of the selected print queue is passed to the OS 313 (step S601). In the present embodiment, assume that a virtual printer that is associated with the cloud printer service 322 and registered in the cloud print service 321 is selected as the default printer.

The OS 313 enables an object that triggers the display of an UI screen of the print settings extension application 312 (step S602). For example, an object 1004 of FIG. 10, which is a "print" button, is displayed in an enabled manner. By selection of an object 1002, the user changes print settings (step S603). When the user selects the object 1004 in the print settings screen of FIG. 10, a print instruction is inputted into the OS 313 (step S604). The OS 313 executes subsequent processing that is related to printing based on the inputted instruction.

Upon instruction of print execution, the OS 313 generates intermediate data and passes, to the print settings extension application 312, the generated intermediate data and the print setting information edited in the print settings screen of FIG. 10 (step S605). Here, the intermediate data is data that is generated prior to conversion into print data, such as page description language (PDL), and in the present embodiment, XPS data will be described as one example. The print settings information may be included in the intermediate data.

Upon receiving the intermediate data and the print setting information from the OS 313, the print settings extension application 312 generates print data based on the intermediate data. In addition, the print settings extension application 312 generates print capability information based on the print settings information (step S606). Here, the print data is PDL such as a PDF file, for example, and the print capability information is information for which the print settings information has been described in an attribute value defined by the Internet Printing Protocol (IPP).

Figure 5:
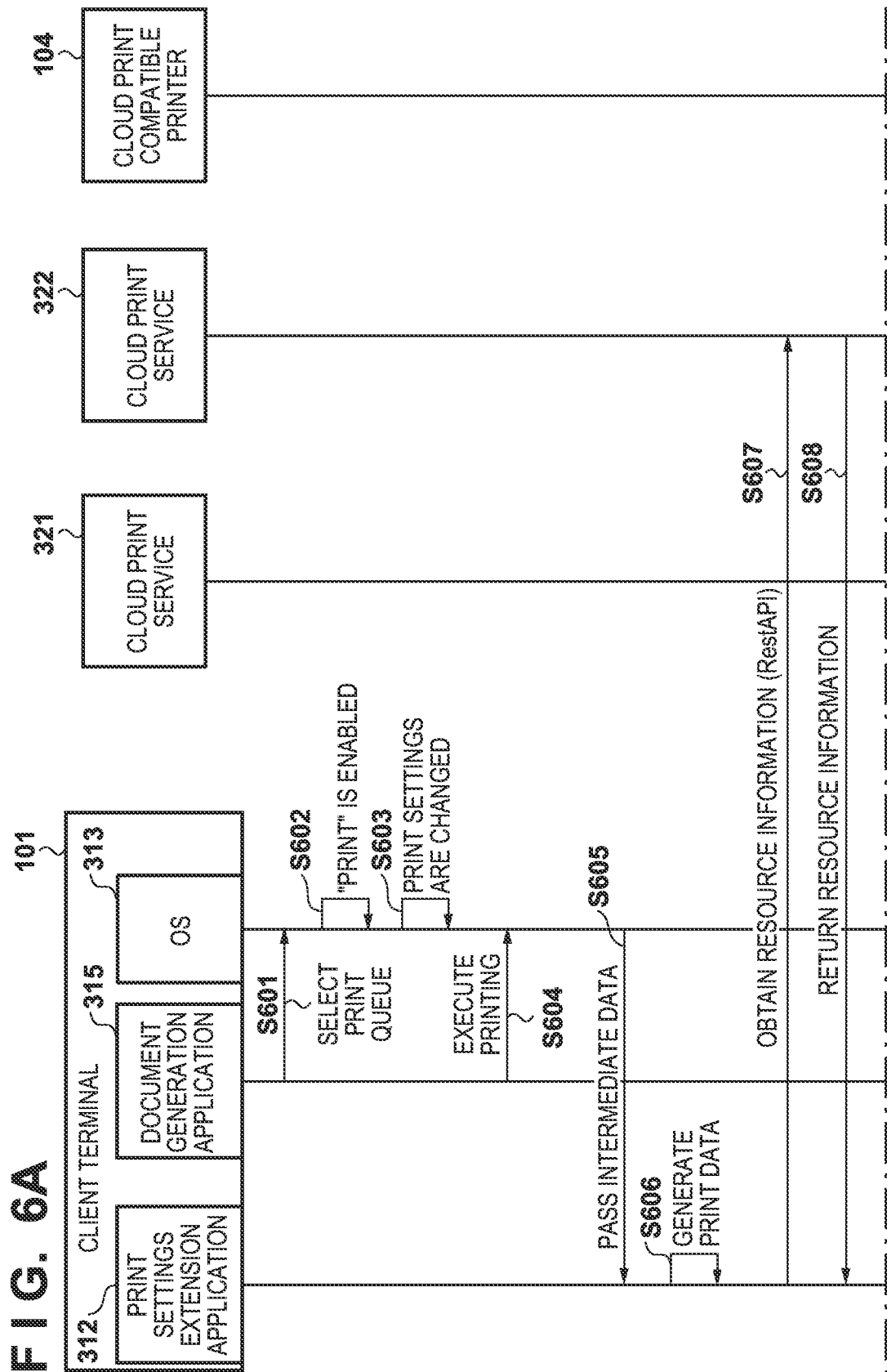
FIGS. 5A to 5C are diagrams illustrating device configuration information managed by the OS.

The print settings extension application 312 queries for resource information of the cloud print service 322 using the tenant URL of the cloud print service 322 in the device configuration information of FIGS. 5A to 5C, which is managed by the OS 313 (step S607).

FIG. 11 is a diagram illustrating an example of a command for obtaining resource information using a tenant URL. FIG. 11 illustrates an example for when obtainment is performed using a REST API, which is an API for realizing communication between web services. In the present embodiment, a description will be given using print budget information (Budget information) as an example. The print settings extension application 312 obtains, as a response to REST API, the user's print budget information (step S608). After step S606, the print settings extension application 312 obtains cost information from the print data generated in step S606 and the number of printing sheets necessary for printing, which has been read out from the print capability information. In the present embodiment, fee information obtained by multiplying the number of the printing sheets necessary for printing and the fee per printing sheet will be described as an example of the cost information. The fee per printing sheet may be obtained together with the print budget information in step S608.

The print settings extension application 312 obtains the fee information from the print data and compares the obtained fee information with the print budget information obtained in step S608. Here, when it is determined that the fee information is less than the print budget information (step S609), the print settings extension application 312 determines that printing is possible and passes the print data and the print capability information to the print queue of the OS 313 (step S611). Meanwhile, when it is determined that the fee information is greater than or equal to the print budget information (step S610), it is determined that printing is not possible, the OS 313 is notified that printing is not possible, and the processing of FIGS. 6A and 6B is terminated (step S616).

The OS 313 transmits the print data and print capability information passed from the print settings extension application 312 in step S611 to the cloud print service 321 via the print queue (step S612). Information by which a tenant of the cloud print service 322 can be identified is added to the print capability information. Here, the information by which a tenant of the cloud print service 322 can be identified is, for example, a tenant URL of a description 501 described in the device configuration information of FIGS. 5A to 5C.

The cloud print service 321 confirms settings of the print capability information. If a tenant URL is set in the print capability information, the cloud print service 321 transfers the print data and the print capability information to the cloud print service 322 (step S613).

The cloud print service 322 transmits the received print data and print capability information to the cloud print compatible printer 104 (step S614). When printing is completed, a notification that printing is completed is notified to the OS 313 of the client terminal 101 via the cloud print service 322 and the cloud print service 321 (step S615).

As described above, print data in which print settings that have been performed using the print settings extension application 312 have been reflected can be printed by the cloud print compatible printer 104 via the cloud print service 321.

Figure 7:
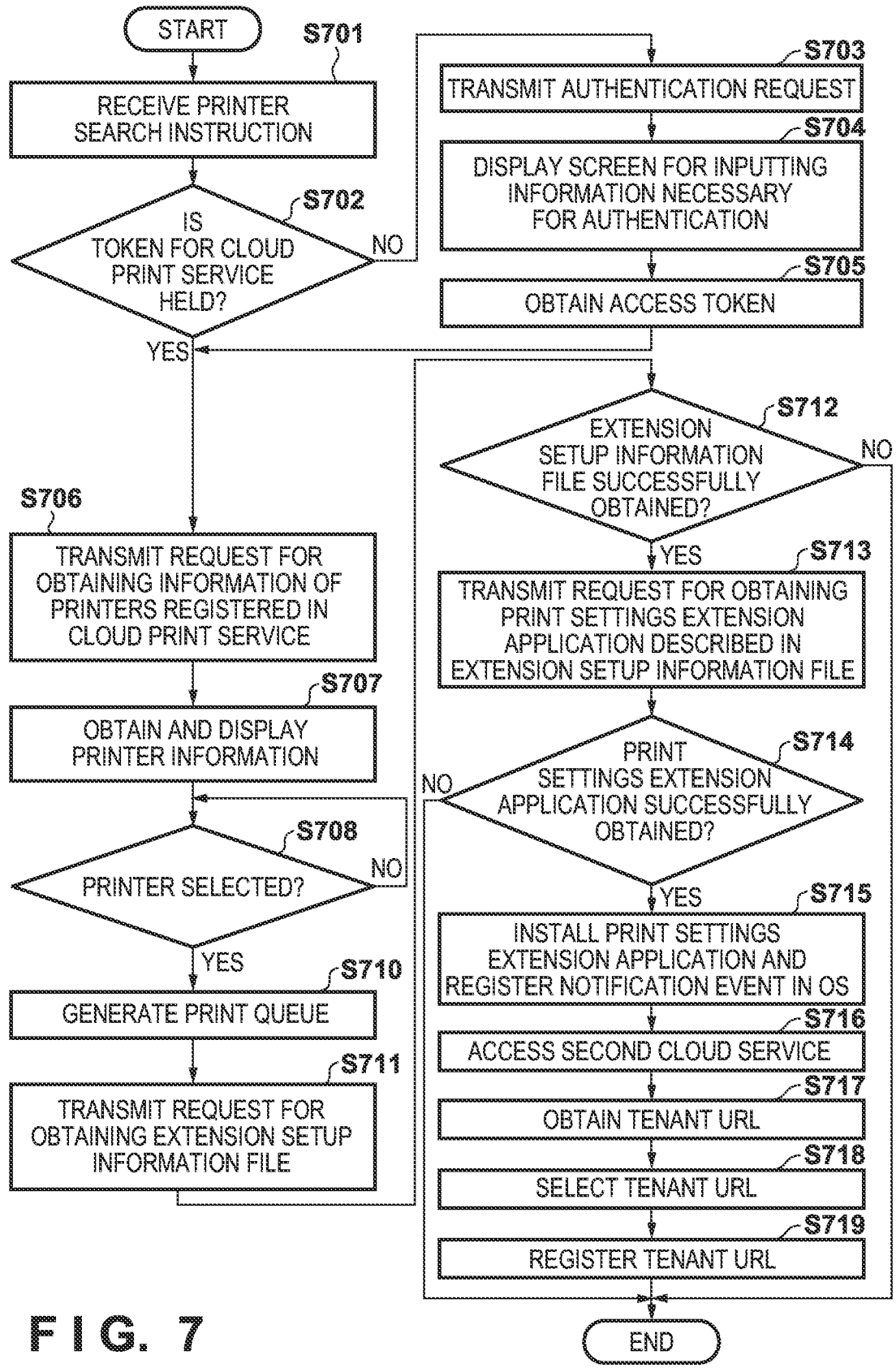
FIG. 7 is a flowchart for explaining processing by the OS.
Figures 8A, 8B:
FIGS. 8A and 8B are diagrams illustrating a screen displayed by the OS.

FIG. 7 is a flowchart illustrating processing of the OS 313 until the print settings extension application 312 is installed on the client terminal 101 and the registration of the tenant URL of the cloud print service 322 is completed. A program for executing the processing that is described in this flowchart is stored in the storage unit 214 of the client terminal 101. The processing of FIG. 7 is realized by the CPU 212 executing the program.

The CPU 212 displays the setting screen illustrated in FIG. 4 and receives a printer search instruction (step S701). For example, by the user selecting the object 401 of FIG. 4, the CPU 212 receives a printer search instruction. Step S701 corresponds to step S302 of FIGS. 3A and 3B.

The CPU 212 determines whether the access token of the cloud print service 321 is stored (step S702). The client terminal 101 stores an access token for obtaining information from the cloud print service 321 for each user who logs in to the client terminal 101. The CPU 212 determines whether an access token associated with the user logged in to the client terminal 101 is stored. If it is determined that the access token is stored, the processing proceeds to step S706. If it is determined that the access token is not stored, the CPU 212 transmits an authorization request to the cloud print service 321 (step S703). Then, the CPU 212 receives, from the cloud print service 321, URL information for displaying a screen for inputting information to be used for authentication.

The CPU 212 accesses the received URL information and displays a screen for inputting the information to be used for authentication (step S704). The information to be used for authentication is, for example, a user ID (user identifier) and a password. The CPU 212 transmits, to the cloud print service 321, the inputted information to be used for authentication and obtains an access token (step S705). If the authentication to the cloud print service 321 is unsuccessful, the CPU 212 cannot obtain an access token, and the processing of FIG. 7 is terminated. Step S702 to step S705 correspond to step S303 to step S307 of FIGS. 3A and 3B.

The CPU 212 transmits, to the cloud print service 321, a request for obtaining printer information that is registered in the cloud print service 321, using the access token (step S706). The cloud print service 321 selects the information of printers that can be used by the user identified by the received access token and transmits the information to the client terminal 101. The printer names registered in association with the printers that can be used by the user identified by the access token received from the client terminal 101 and the device identification information (HWID) of the printer are transmitted to the client terminal 101 as printer information. Step S706 corresponds to steps S308 and S309 of FIGS. 3A and 3B.

The CPU 212 displays, on the display unit of the client terminal 101, the printer information obtained from the cloud print service 321 (step S707). The printer information is displayed as a list of printers in the region 402 of the setting screen of FIG. 4 by the displaying in step S707. The CPU 212 determines whether printer information has been selected (step S708). If it is determined that the printer information has been selected, the processing proceeds to step S710. If it is determined that the printer information has not been selected, the processing of step S708 is repeated.

When the printer information is selected, the CPU 212 generates a print queue based on information obtained from the cloud print service 321 (step S710). The information obtained from the cloud print service 321 is, for example, an access URL by which the cloud print service 322 can be accessed and printer information. Step S707 to step S710 correspond to step S310 to step S312 of FIGS. 3A and 3B.

The CPU 212 transmits, to the online support service 351, a request for obtaining an extension setup information file based on the printer information selected in step S708 (step S711). This obtainment request includes the HWID of the printer to which additional identification information has been added. Step S711 corresponds to step S313 of FIGS. 3A and 3B.

The CPU 212 determines whether the extension setup information file has been successfully obtained (step S712). If it is determined that the extension setup information file has been successfully obtained, the processing proceeds to step S713. If it is determined that the extension setup information file has not been successfully obtained, the processing of FIG. 7 is terminated.

The CPU 212 installs the obtained extension setup information file in association with the print queue generated in step S710. Then, the CPU 212 transmits, to the application management service 331, a request to obtain the print settings extension application 312 described in the obtained extension setup information file (step S713). In step S713, the CPU 212 obtains the application identifier of a print settings extension application from the extension setup information file, specifies the obtained application identifier, and transmits a request to obtain a print settings extension application to the application management service 331. Step S713 corresponds to steps S315 and S316 of FIGS. 3A and 3B.

The CPU 212 determines whether the print settings extension application 312 has been successfully obtained (step S714). If it is determined that the print settings extension application 312 has not been successfully obtained, the processing of FIG. 7 is terminated. If it is determined that the print settings extension application 312 has not been successfully obtained, the processing proceeds to step S715.

The CPU 212 installs the obtained print settings extension application 312 and registers the application identifier of the print settings extension application 312 in association with the print queue (step S715). Step S715 corresponds to step S320 of FIGS. 3A and 3B.

The CPU 212 displays the input screen of FIG. 8A. The CPU 212 receives, from the user, an input of account information and password information (user information) that are registered in a tenant of the cloud print service 322 (step S716). Upon receiving the input, the CPU 212 reads the access URL of the cloud print service 322 registered in the print settings extension application 312 and accesses the cloud print service 322. At the time of the access, the inputted user information is also transmitted. The cloud print service 322 identifies the tenant information and the tenant URL that match the transmitted user information and transmits them to the client terminal 101 (step S717). Step S717 corresponds to steps S321 and S322 of FIGS. 3A and 3B. The CPU 212 displays a screen of FIG. 8B in which a selection from the user can be received based on the obtained tenant information and tenant URL (step S718).

The CPU 212 registers, in the device configuration information of FIGS. 5A to 5C, which is managed by the OS 313, the tenant URL that corresponds to the tenant information for which the selection from the user has been received (step S719). The registered tenant information is, for example, an attribute in a tag defined by a "CloudTenantUrl" identifier in the device configuration information of FIGS. 5A to 5C.

This concludes the processing of the OS 313 until the print settings extension application 312 is installed in the client terminal 101 and setup is completed.

As illustrated in the description 1401 of FIGS. 14A and 14B, a configuration may be taken such that, regarding the device configuration information of FIGS. 5A to 5C, the tenant URL information can be held for each logged-in user of the OS. In FIGS. 14A and 14B, an attribute in a tag defined by, for example, a "LoginUser" identifier is illustrated. With such a configuration, the operation of the present embodiment can be applied even in a multi-user login environment.

Next, processing for generating print data using the installed print settings extension application 312 and determining whether to execute printing will be described with reference to FIG. 9. A program for executing the processing of FIG. 9 is stored, for example, in the print settings extension application 312. The processing of FIG. 9 is realized by the CPU 212 loading the program in the memory 213 and executing the program.

The CPU 212 waits for intermediate data and print settings information from the OS 313 according to the print settings extension application 312 (step S901) and determines whether the print settings extension application 312 has received the intermediate data and the print settings information from the OS 313 (step S902). If it is determined that intermediate data and print setting information have not been received, the processing from step S901 is repeated. If it is determined that intermediate data and print setting information have been received, the processing proceeds to step S903.

The CPU 212 generates print data and print capability information based on the intermediate data and the print settings information received by the print settings extension application 312 (step S903). The CPU 212 generates print data in a predetermined format based on the received intermediate data. The CPU 212 also generates print capability information described using an attribute value defined by IPP based on the received print settings information. Step S903 corresponds to step S606 of FIGS. 6A and 6B.

The CPU 212 reads out a tenant URL of the cloud print service 322 stored in the device configuration information managed by the OS 313. For example, the tenant URL of the cloud print service 322 stored in an attribute in a tag defined by a "CloudTenantUrl" identifier of the device configuration information of FIGS. 5A to 5C are read out. The CPU 212 accesses a tenant of the cloud print service 322 using the read tenant URL and obtains resource information (step S904). The resource information here is, for example, print budget information (Budget), fee information per printing sheet, information on the maximum number of copies and the number of pages that can be printed, the maximum size of job data that can be printed, and the expiration date (subscription) information of the printing function. That is, it is printing limitation information for executing printing without the occurrence of an error on the cloud print service side. Step S904 corresponds to steps S607 and S608 of FIGS. 6A and 6B.

The CPU 212 obtains fee information from the print data generated in step S903. The CPU 212 compares the tenant's printing limitation information obtained in step S904 with the fee information obtained from the print data generated in step S903 and the print capability information and determines whether printing can be executed in the cloud print service 322 (step S905). For example, assume that the print budget information read out using the tenant URL is 1000 yen. Meanwhile, assume that information that the number of printing sheets necessary for printing is 100 and a fee per printing sheet is 3 yen is obtained from the print data and the print capability information. In this case, the fee information obtained from the print data and the print capability information is 100×3=300 yen. In such a case, since the print budget information is larger than the fee information, it is determined that printing can be executed.

Here, when the print budget information is smaller than the fee information and it is determined that printing cannot be executed, the CPU 212 executes processing for displaying a message screen notifying that the job is canceled (step S906). That is, print data and print capability information are not transmitted to the cloud print service 321. After step S906, the processing from step S901 is repeated.

Figure 13:
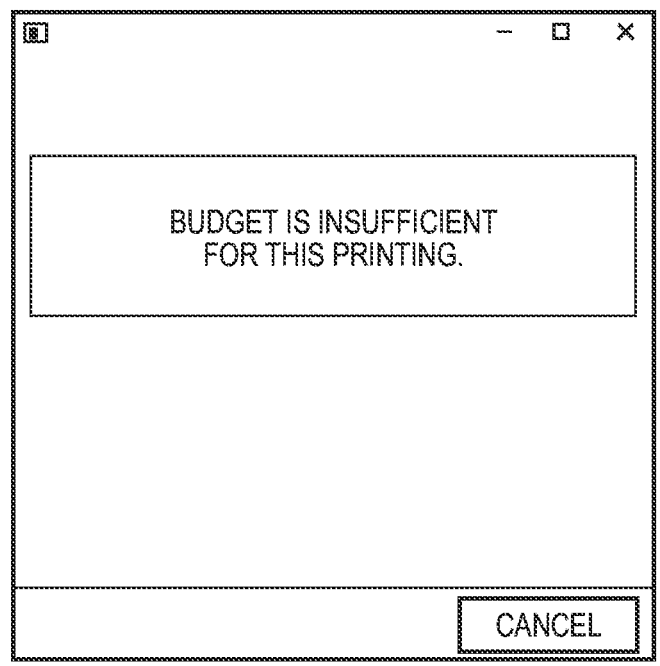
FIG. 13 is a diagram illustrating a screen displayed by the print settings extension application.

FIG. 13 is a diagram illustrating an example of a message screen to be displayed in step S906. If it is determined in step S905 that printing can be executed, the processing proceeds to step S907. The CPU 212 provides the OS 313 with the print data generated in step S903 and the print capability information (step S907). After step S907, the OS 313 transmits, to the cloud print service 321, the print data and print capability information received via the print queue.

As described above, when a print queue associated with a general-purpose cloud printer driver is selected and printing is performed, if it is determined that an error will occur in the cloud print service 322, the user can be notified before print data is transmitted to the cloud print service. Thus, it is possible to prevent, in advance, failure of printing.

In addition, in the present embodiment, fee information has been described as an example of cost information; however, the present disclosure is not limited to information related to the amount of money, and other information may be used as the cost information. For example, information on the amount of consumables, such as ink, and time related to printing may be used as the cost information.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-137106, filed Aug. 30, 2022, which is hereby incorporated by reference herein in its entirety.

What is claimed is:

1. A non-transitory computer-readable storage medium storing a program configured to cause a computer of an information processing apparatus to execute a method comprising:
generating print data for causing a printer that can execute a cloud print service to execute printing;
obtaining cost information for when printing is executed based on the print data generated;
obtaining limitation information related to cost and held in the cloud print service; and
determining whether to execute printing according to the cloud print service based on the cost information obtained and the limitation information obtained and control transmission of the print data generated to the cloud print service based on a result of that determination.

2. The non-transitory computer-readable storage medium according to claim 1, wherein in a case where it is determined that printing according to the cloud print service can be executed, performing control so as to transmit the print data generated to the cloud print service, and in a case where it is determined that printing according to the cloud print service cannot be executed, performing control so as to not transmit the print data generated to the cloud print service.

3. The non-transitory computer-readable storage medium according to claim 2, wherein the cloud print service includes a plurality of tenants, and obtains the limitation information from a tenant included in the plurality of tenants.

4. The non-transitory computer-readable storage medium according to claim 3, wherein the limitation information from the tenant according to predetermined communication.

5. The non-transitory computer-readable storage medium according to claim 4, wherein the predetermined communication is communication in which a REST API is used.

6. The non-transitory computer-readable storage medium according to claim 3, wherein the tenant is a tenant selected from at least one tenant that corresponds to a user that has instructed printing according to the cloud print service.

7. The non-transitory computer-readable storage medium according to claim 3, wherein information for accessing the tenant is obtained and obtains the limitation information from the tenant based on that access information.

8. The non-transitory computer-readable storage medium according to claim 7, wherein the access information is obtained from software different from an application.

9. The non-transitory computer-readable storage medium according to claim 8, wherein the software is an operating system (OS).

10. The non-transitory computer-readable storage medium according to claim 9, wherein the access information is information included in device configuration information managed by the OS.

11. The non-transitory computer-readable storage medium according to claim 10, wherein the access information is associated for each login user of the information processing apparatus.

12. The non-transitory computer-readable storage medium according to claim 9, wherein the print data is generated based on intermediate data obtained from the OS.

13. The non-transitory computer-readable storage medium according to claim 12, in a case where it is determined that printing according to the cloud print service can be executed, causes the print data generated to be transmitted to the cloud print service by passing the print data to the OS.

14. The non-transitory computer-readable storage medium according to claim 1, wherein fee information is obtained as the cost information.

15. The non-transitory computer-readable storage medium according to claim 14, wherein the fee information is obtained based on information obtained from the print data.

16. The non-transitory computer-readable storage medium according to claim 15, wherein the information obtained from the print data includes at least one of the number of printing sheets and the number of copies.

17. The non-transitory computer-readable storage medium according to claim 14, wherein budget information is obtained as the limitation information.

18. The non-transitory computer-readable storage medium according to claim 17, wherein it is determined whether printing according to the cloud print service can be executed by comparing the fee information and the budget information.

19. The non-transitory computer-readable storage medium according to claim 1, wherein in a case where it is determined that printing according to the cloud print service, as a second cloud print service, can be executed, the print data generated is transmitted to the second cloud print service via a first cloud print service different from the second cloud print service.

20. An information processing apparatus comprising:
at least one memory and at least one processor which function as:
a generation unit configured to generate print data for causing a printer that can execute a cloud print service to execute printing;
a first obtainment unit configured to obtain cost information for when printing is executed based on the print data generated by the generation unit;
a second obtainment unit configured to obtain limitation information related to cost and held in the cloud print service; and
a control unit configured to determine whether to execute printing according to the cloud print service based on the cost information obtained by the first obtainment unit and the limitation information obtained by the second obtainment unit and control transmission of the print data generated by the generation unit to the cloud print service based on a result of that determination.

21. A method executed in an information processing apparatus, the method comprising:
generating print data for causing a printer that can execute a cloud print service to execute printing;

obtaining cost information for when printing is executed based on the generated print data;
obtaining limitation information related to cost and held in the cloud print service; and
determining whether to execute printing according to the cloud print service based on the obtained cost information and the obtained limitation information and controlling transmission of the generated print data to the cloud print service based on a result of that determining.

* * * * *